(No Model.)
P. BARDON.
BALE TIE.
No. 488,302. Patented Dec. 20, 1892.
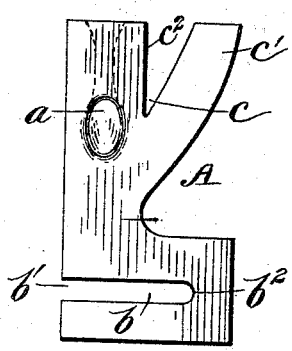
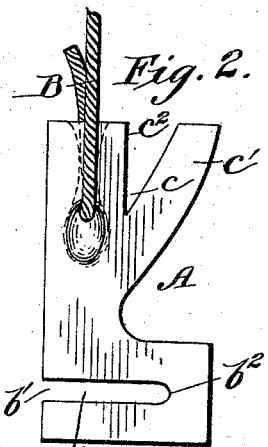
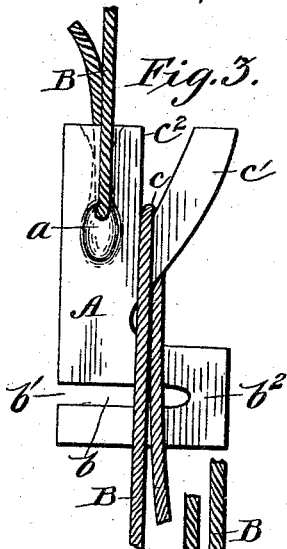
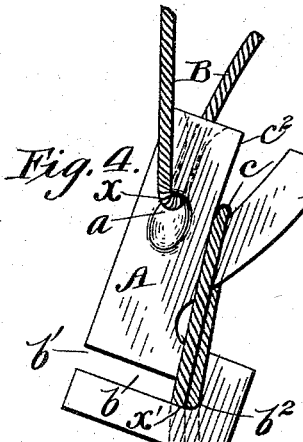
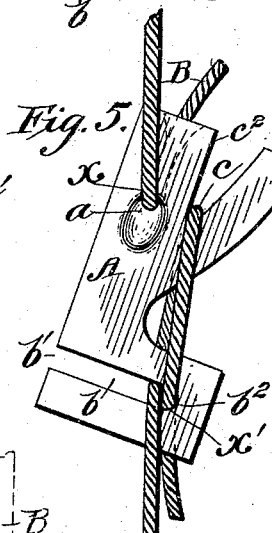
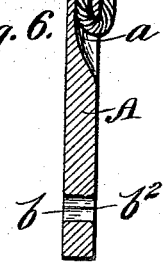
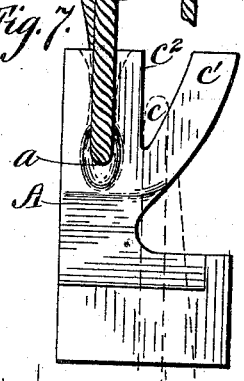
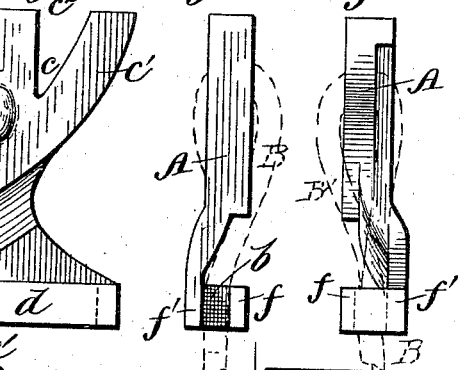

UNITED STATES PATENT OFFICE.

PROSPER BARDON, OF WACO, TEXAS.

BALE-TIE.

SPECIFICATION forming part of Letters Patent No. 488,302, dated December 20, 1892.

Application filed April 16, 1892. Serial No. 429,389. (No model.)

*To all whom it may concern:*

Be it known that I, PROSPER BARDON, a citizen of the United States, residing at Waco, in the county of McLennan and State of Texas, have invented certain new and useful Improvements in Cotton and other Bale-Buckles for Use with Wire Cables or Wire Bindings; and I do hereby declare the following to be a full, clear, and exact description of the invention, such as will enable others skilled in the art to which it appertains to make and use the same.

My invention relates to metallic tie buckles for use with binding cables of wire, or single wire strands, and its object is to facilitate the connecting with and the securing of the binding wire cables, or single wire strands, upon the buckles, and at the same time utilize the expansive force of the cotton forming the bale, for adjusting the buckle to an oblique or diagonal position, thus insuring the retention of the binding cables upon them, and also preventing the wire cables from slipping upon the buckles when the bale is relieved from the compress.

My invention consists in a novel construction of cotton bale tie or other bale buckles, for use with wire bindings, or wire cables, as will be hereinafter described and specifically claimed.

In the accompanying drawings, Figure 1 is a top or face view of my improved cotton bale tie-buckle, in one of its forms of construction, and as best adapted for small wires or cables, as it appears before being put into use; Fig. 2 a similar view of the same as it appears when placed on a cotton bale, and one end of a binding wire or cable has been passed through a tubular passage or eye therein, and turned upward; Fig. 3 a similar view of the same as it appears after the other terminus of the wire binding, or cable has been secured within a V-shaped crotch formed by an oblique or divergent wing and a portion of one side of the buckle; Fig. 4 a similar view of the same as it appears when one terminus of the wire binding, or cable has been passed into a straight transverse slot and down through said slot and under one of the jaws of said slot; Fig. 5 a similar view of the same as it appears after one portion of one terminus of the wire is passed into the slot, over the said jaw and under the other jaw, and the other portion up through the crotch, over the wing, over one of the jaws of the transverse slot and down through the slot and under the other jaw of the slot, and turned upward. Fig. 6 is a longitudinal section of the buckle and wire, or cable shown in Fig. 2, in the line of the tubular eye. Fig. 7 is a top or face view of the buckle as preferably constructed for use with large wire, the wire binding, or cable being shown at one terminus in full lines and at the other by dotted lines. Fig. 8 is an edge view of the buckle shown in Fig. 7, the binding wire or cable being shown by dotted lines. Fig. 9 is an opposite edge view of the buckle shown in Fig. 7, one terminus of the binding wire, or cable being shown by dotted lines. Fig. 10 is a top view of another desirable form of tie buckle for large wire; Fig. 11 one edge view of the same, and Fig. 12 the opposite edge view thereof. In views 11 and 12, one terminus of the binding wire, or cable is shown by dotted lines. Fig. 13 is an end view of the buckle shown in Figs. 10, 11 and 12.

A in the drawings represent the buckle, and B the wire, or binding-cable, or single wire.

The buckle is constructed with a tubular, oval-shaped, longitudinal passage $a$ and a transverse slot $b$, open at one edge of buckle as indicated at $b'$, and closed at the other edge thereof, as indicated at $b^2$, having at $b^2$ a segmental shaped terminus. On one side of that portion of the buckle in which the tubular eye $a$ is formed a crotch $c$ of approximately V-shape, is provided, said crotch being formed between an oblique hook-wing $c'$, and a longitudinal straight edge $c^2$ of that portion of the buckle in which the oval passage $a$ is formed.

The different ways in which the wire, or binding cable B is applied upon the tie buckle, being illustrated in the drawings, and having been explained in giving a description of the figures, it is not deemed necessary to repeat, particularly, the same here.

The operation of the tie buckle in connection with the wire cable or plain single wire will be understood from the following: The wire cable B at one end is passed back over the front portion of the buckle and forward through the tubular passage $a$, and at the other end is passed over the lower part of the buckle, then into the crotch and under the wing $c'$; the lower end of the buckle is now pushed to the right far enough to permit the double terminus of the wire cable to enter into the slot, $b$ at the opening $b'$, and occupy a position at the segmental shaped part $b^2$ of the slot which is gaged to suit the wire used; thus adjusted, both parts of the doubled portion of one terminus of the cable lie under the lower or outer jaw of the slot; or the portions of the said terminus of the cable may be adjusted so that one of them lies under the lower or outer jaw of the slot and the other on top, the same as shown in Fig. 5, and thus, whether the cable is passed into the slot adjusted in either the way shown in Fig. 4 or in Fig. 5, the force or tension of the cable, intermediate of its tying ends, will, when the bale is relieved from the compress, by reason of the expansion of the cotton bale and the relative location of the pulling points of the buckle, draw and cause a tension on the buckle in a straight or direct line between the points $x$, $x'$, and thereby throw the lower end of the buckle to the left and place it in such an oblique position as to keep the cable or wire firmly wedging in the V-shaped crotch $c$; in holding contact at $a$; and confined in the slot $b$, as illustrated in Figs. 4 and 5. Thus, when the buckle is pushed to the right far enough to insert the doubled portion of the wire cable into a slot, and the compress removed, the buckle will be automatically moved by the tension of the wire cable on the pulling points, and be thrown again to the left and made to press hard at $b^2$ upon the cable, and the cable made to wedge in the crotch $c$, while at the same time the tie and cable will be prevented from slipping or passing over or under one another by the force of the expansion of the bale, when it is freed, as stated, from the compress.

In constructing the buckle, the lower jaw of the slot $b$ may have parallel faces which run oblique to the face of the buckle as at $d$ $d'$ in Figs. 7, 8 and 9; or these faces may be parallel with the face of the buckle as shown at $f$ $f'$ in Figs. 10, 11, 12 and 13; or the slot may be cut through the buckle in a direction at right angles to the face of the buckle; as at $b$ in Fig. 6. These changes are made in order to adapt the buckle for light and heavy wire. The heavier wire requires straight lines while light wire being more flexible can be bent more readily and made to conform to lines which are not straight. The passages through which the wire cables pass are fully as large or a little larger than the cables, so as to permit perfect working of the buckle, and the passage $a$ is made oval and flared so as to allow the cable some play right and left, in all the constructions, the tying operation of the buckle is the same.

It is contemplated to use annealed steel wire cables or single wires, which are lighter and stronger than iron bands.

The buckle herein described is very effective, by reason of being provided with the V-shaped crotch and wing, and the wire wedging at said crotch; and with the jaws between which the wire cable passes and is held secure; and, on account of the straight line tension pull of the cables between the points $x$ $x'$; the construction of the buckle and its pulling points enabling me to utilize the power of expansion of the bale to make a more secure and complete tie.

What I claim as my invention is:—

1. The tie buckle adapted for use with wire cable or wire binding, constructed with a passage $a$ for one end of the bale wire cable to be passed through, a crotch $c$ formed between an oblique or divergent wing $c'$ and the edge $c^2$ of that portion of the buckle in which the passage $a$ is formed, and a transverse slot $b$, open at one edge and closed at the other edge of the buckle, substantially as described.

2. The tie buckle formed with a passage $a$, a V-shaped crotch $c$ and a transverse passage which is open at one edge and closed at the other edge of the buckle, and formed between top and bottom jaws of the buckle, and open through to the end of the buckle, substantially as described.

3. The tie buckle formed with an oval and flaring passage $a$, a V-shaped crotch $c$ between hook $c'$ and edge $c^2$ of the buckle, and a transverse slot, substantially as described.

4. The combination of the wire cable or wire binding, with the buckle formed with a tubular passage $a$, a V-shaped crotch $c$ between wing or hook $c'$, and edge $c^2$ of the buckle, and transverse slot $b$, open at one edge and closed at the other, all substantially as described.

In testimony whereof I hereunto affix my signature in presence of two witnesses.

PROSPER BARDON.

Witnesses:
B. R. CHANDLER,
R. L. LEONARD.